(12) United States Patent
Iwamura

(10) Patent No.: US 7,552,335 B2
(45) Date of Patent: Jun. 23, 2009

(54) INFORMATION PROCESSING APPARATUS, METHOD THEREFOR, COMPUTER PROGRAM, AND COMPUTER-READABLE STORAGE MEDIUM

(75) Inventor: Keiichi Iwamura, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 656 days.

(21) Appl. No.: 10/712,869

(22) Filed: Nov. 12, 2003

(65) Prior Publication Data

US 2004/0107348 A1    Jun. 3, 2004

(30) Foreign Application Priority Data

Nov. 15, 2002  (JP)  ............... 2002-332577
Oct. 3, 2003   (JP)  ............... 2003-346140

(51) Int. Cl.
   *H04L 9/00*    (2006.01)
(52) U.S. Cl. ...................... 713/176; 713/181
(58) Field of Classification Search .................. 705/54; 713/176, 170, 181
   See application file for complete search history.

(56) References Cited

U.S. PATENT DOCUMENTS

| | | | |
|---|---|---|---|
| 5,473,691 A * | 12/1995 | Menezes et al. ............. | 713/161 |
| 5,499,294 A | 3/1996 | Friedman | |
| 5,673,316 A * | 9/1997 | Auerbach et al. ............. | 705/51 |
| 5,982,891 A * | 11/1999 | Ginter et al. .................. | 705/54 |
| 6,333,752 B1 * | 12/2001 | Hasegawa et al. ........... | 715/764 |
| 6,397,332 B2 * | 5/2002 | Kawano et al. ............. | 713/176 |
| 6,671,805 B1 * | 12/2003 | Brown et al. ................. | 713/176 |
| 6,895,507 B1 * | 5/2005 | Teppler ........................ | 726/19 |
| 6,918,083 B2 * | 7/2005 | Smith .......................... | 715/229 |
| 7,162,635 B2 * | 1/2007 | Bisbee et al. ................ | 713/176 |

* cited by examiner

*Primary Examiner*—Gilberto Barron, Jr.
*Assistant Examiner*—Cordelia Kane
(74) *Attorney, Agent, or Firm*—Canon USA Inc IP Division

(57) ABSTRACT

The present invention provides a technique that allows for a valid modification that is authorized by the author of data, while assuring the originality of the data. An information processing apparatus for processing original data created by a predetermined author is provided. The information processing apparatus includes a modification-information storing unit for storing modification information regarding a modification onto a storage medium when the original data is modified, and a modification-assuring-information creating unit for creating modification assuring information for assuring that the modification information is true.

7 Claims, 8 Drawing Sheets

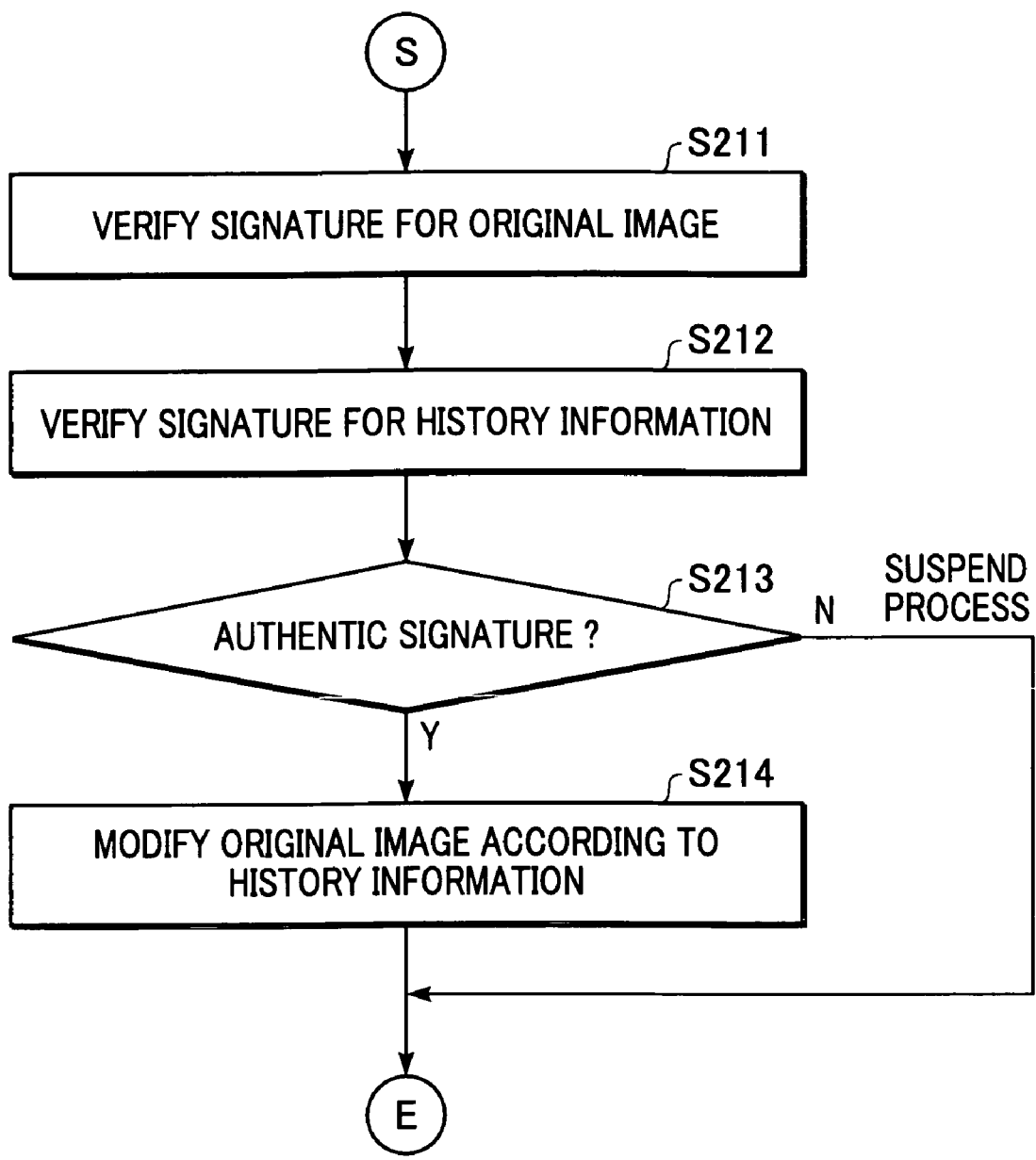

| HISTORY INFORMATION | DIGITAL SIGNATURE | DESCRIPTION |
|---|---|---|
| HISTORY 1 | SIGNATURE 1 | BRIGHTNESS CHANGE |
| HISTORY 2 | SIGNATURE 2 | CUTOUT |
| ⋮ | ⋮ | ⋮ |

INFORMATION PROCESSING APPARATUS, METHOD THEREFOR, COMPUTER PROGRAM, AND COMPUTER-READABLE STORAGE MEDIUM

BACKGROUND OF THE INVENTION

1. Field of the Invention

The present invention relates to an information processing apparatus, a method therefor, a computer program, and a computer-readable storage medium that are particularly preferable for use in assuring the originality of data.

2. Description of the Related Art

Recently, in conjunction with widespread use of computers and the Internet, formats in which information is digitized and is used as digital data are becoming more common. On the other hand, digital data has features in which an identical copy can be easily generated and editing processing is readily executed. Thus, it is important to assure the originality of digital data.

For example, as described in U.S. Pat. No. 5,499,294, in order to assure the originality of digital data, it is generally known that a technique in which a digital signature is created, using public key encryption, for a hash value of a digital image can secure the originality of the digital data. U.S. Pat. No. 5,499,294 uses a hash function and public key decryption to generate digital signature data. With the digital signature, a sender transmits data and signature data corresponding thereto together to a receiver and then the receiver checks the validity of the data by verifying the signature data.

An approach for checking the validity of data by generating digital signature data using a hash function and public-key encryption per the method disclosed in U.S. Pat. No. 5,499,294 will now be discussed in an easy-to-understand manner in conjunction with a known conventional technique.

First, a sender compresses plain-text data M using a hash function and performs a calculation to determine an output h having a constant length (the output h having a constant length is referred to as a "hash value"). In this case, a private key is represented by Ks and Kp represents a public key.

Next, a calculation for creating digital signature data s is performed by converting the constant-length output h with the private key Ks. This calculation is given as expression (1) below.

$$D(Ks, h) = s \quad (1)$$

Thereafter, the digital signature data s and the plain-text data M are transmitted to a receiver.

The receiver performs a calculation for converting the received digital signature data s with the public key Kp. This calculation is given as expression (2) below.

$$E(Kp, s) = E(Kp, D(Ks, h'')) = h'' \quad (2)$$

The receiver also performs a calculation for determining a constant-length output h' by compressing the received plain-text data M' using the same hash function as the sender. When the constant-length output h' determined by the calculation and the constant-length output h'' obtained from expression (2) match each other, it is determined that the received plain-text data M' is valid.

If the plain-text data M is tampered with during the communication, the constant-length output h'' obtained from expression (2) and the constant-length output h' obtained by compressing the received plain-text data M' with the same hash function as the sender do not match each other. Thus, tampering of the plain-text data M can be detected.

In this case, if the digital signature data s is also tapered with in conjunction with tampering of the plain-text data M, the tampering cannot be detected. However, in order to tamper with the digital signature data s, the plain-text data M has to be obtained from the constant-length output h, but such a calculation is impossible because of the one-way property of the hash function.

The hash function will now be described.

The hash function is used to speed up the generation of the digital signature data s. The hash function serves to process the plain-text data M having an arbitrary length and output the constant-length output h. The constant-length output h is referred to as a hash value (or a message digest or digital fingerprint) of the plain-text data M.

The hash function requires the one-way property and collision resistance. The one-way property means that, when the constant-length output h is given, it is difficult to mathematically calculate the plain-text data M that satisfies h=H(M). The collision resistance means that, when the plain-text data M is given, it is difficult to mathematically calculate the plain-text data M' (M≠M') that satisfies H(M)=H(M') and is difficult to mathematically calculate the plain-text data M and M' that satisfy H(M)=H(M') and M≠M'.

As the hash function, MD2, MD-4, MD-5, SHA-1, RIPEMD-128, RIPEMD-160, and the like are known and these algorithms are generally available to the public.

Next, public-key encryption will be described.

Public key encryption is an encryption scheme in which an encryption key and a decryption key are different from each other with the encryption key being made public and the decryption key being kept secret. The public key encryption mainly has the following three features.

(a) there is no need to deliver the encryption key in a secret manner, thereby facilitating the delivery, since the encryption key and the decryption key are different from each other and the encryption key can be made public.

(b) each user only needs to keep his or her own decryption key secret, since the encryption key thereof is available to the public.

(c) it is possible to achieve a verification function that allows a receiver to check whether the sender of a transmitted message is not an impersonator and whether the message is not tampered with.

For example, when an encryption operation using the public encryption key Kp for the plain-text data M is represented by E(Kp, M) and an decryption operation using the private decryption key Ks for the plain-text data M is represented by D(Ks, M), the public-key encryption algorithm satisfies the following two conditions.

(1) when the public encryption key Kp is given, it is easy to perform the encryption operation E(Kp, M), and, when the private decryption key Ks is given, it is easy to perform the decryption operation D(Ks, M).

(2) if the private decryption key Ks is not known, it is difficult to obtain the plain-text data M in terms of the amount of calculation even if the public encryption key Kp, a calculation procedure for the encryption operation E, and C=E(Kp, M) are known.

In addition to conditions (1) and (2) described above, when condition (3) below is satisfied, secure communication can be accomplished.

(3) the encryption operation E(Kp, M) can be defined for the all plain-text data M, and expression (4) below is satisfied.

$$D(Ks, E(Kp, M)) = M \quad (4)$$

That is, since the public encryption key Kp is made public, anyone can perform the encryption operation E(Kp, M), but one who can perform the decryption operation D(Ks, E(Kp, M)) to obtain the plain-text data M is only a person who has the private decryption key Ks.

In addition to conditions (1) and (2) described above, when condition (4) below is satisfied, verified communication can be accomplished.

(4) the decryption operation D(Ks, M) can be defined for the all plain-text data M, and expression (5) below is satisfied.

$$E(Kp, D(Ks, M))=M \qquad (5)$$

That is, one who can perform the decryption operation D(Ks, M) is only a person who has the private decryption key Ks. Thus, even when another person performs the decryption operation D(Ks', M) using a false private decryption key Ks' to impersonate the authentic person having the private decryption key Ks, expression (5) described above is not satisfied (E(Kp, D(Ks', M))≠M) and thus the receiver can verify that the received information is unauthorized.

Also, when the decryption operation D(Ks, M) is tampered with, expression (5) described above is not satisfied (E(Kp, D(Ks, M)')≠M) and thus the receiver can verify that the received information is unauthorized.

Typical examples known in the art that allow for the above-described secure communication and verified communication include RSA decryption, R decryption, and W decryption.

RSA-decryption-based decryption and encryption that are most widely used at present can be represented by expression (6) below.

Encryption: Encryption key (e, n) Encryption conversion C=Me (mod n)

Decryption: Decryption key (d, n) Decryption conversion M=Cd (mod n)

$$n=p \cdot q \qquad (6)$$

where p and q are large prime numbers different from each other

As described above, U.S. Pat. No. 5,499,294 discloses a technique for assuring the originality of digital data by creating a digital signature, using public key encryption, for a hash value of a digital image. However, with this technique, when even one bit of digital data with a digital signature is modified, it is considered tampered with even when the modification was permitted by the author of the digital data. Further, with the technique disclosed in U.S. Pat. No. 5,499,294, after data is modified, the only thing that can be determined is that the data is not the original.

An example in which the approach disclosed in U.S. Pat. No. 5,499,294 is applied to a digital camera will now be discussed. Typically, a digital image and digital signature data, which are outputs from the digital camera, are input to a computer (PC). Thereafter, processes, such as changing the brightness for easy visibility of the image, filtering, and cropping of the image are commonly performed.

These processes are intended to make the image easy-to-view and clear, and are permitted by the author of a digital image in many cases. However, with the technique of U.S. Pat. No. 5,499,294, if any process, including those described above, is performed on the digital image after the digital image data has been outputted from the digital camera, the digital image data is considered to have been tampered with.

In this manner, the known technology has a problem in that, when the originality of data is assured with a digital signature or the like, the data cannot be modified even if the modification is authorized.

SUMMARY OF THE INVENTION

In view of the foregoing situations, an object of the present invention is to allow for an authorized/valid modification of digital data while assuring the originality of the data.

Thus, for example, an information processing apparatus according to one preferred embodiment of the present invention is directed to an information processing apparatus for processing original data created by a predetermined author. The information processing apparatus includes modification-information storing means for storing modification information regarding a modification in a storing medium when the original data is modified, and modification-assuring-information creating means for creating modification assuring information for assuring that the modification information is true.

Other objects, features and advantages of the invention will become apparent from the following detailed description taken in conjunction with the accompanying drawings.

BRIEF DESCRIPTION OF THE DRAWINGS

FIG. 4 is a flow chart illustrating processing for verifying the digital signature in the first embodiment.

FIG. 6 shows one example of a table in which history information and digital signatures are listed for each process, in the second embodiment of the present invention.

DESCRIPTION OF THE PREFERRED EMBODIMENTS

Embodiments of the present invention will be described below in detail with reference to the accompanying drawings. Herein, while original digital data is referred to as an "original image", digital data (original data) used in the embodiments is not limited to a digital image data and is thus applicable to any digital data.

First Embodiment

An information processing apparatus according to a first embodiment of the present invention will now be described with reference to the accompanying drawings.

Figure 1A:
FIGS. 1A and 1B are schematic views illustrating original images, signatures, and history information, which are stored in a storage medium, in a first embodiment of the present invention.

First, a digital signature is generated for an original image. This can be achieved by generating a hash value for an original image and creating a digital signature with a private key for the hash value, as described above with respect to U.S. Pat. No. 5,499,294. This digital signature is represented as a first signature 11 (signature 0 in FIG. 1A) and is stored together with an original image 12, as shown in FIG. 1A.

Next, a case in which a first processing is performed on the stored image data 12 and the resulting image is authorized as a valid image will be discussed. This first processing involves modifying the original image, such as changing the brightness for easy visibility of an image, filtering, or cropping the image. The principle of the digital signature can be utilized for any digital data, and in this case as well, the principle of the digital signature is used to create a digital signature for history information 13. Specifically, a hash value is generated for the history information 13 and a digital signature is created with a private key for the hash value.

In this case, the history information 13 refers to information regarding the modification (history) made to the original image 12 in the above-described first processing. In the description below, a digital signature for the history information 13 will be referred to as a second signature (signature 1 in FIG. 1B) 14.

For example, when the first processing is changing the brightness using a digital photo editing software application, the history information 13 for the first processing includes information for identifying the image of interest, information for identifying the digital photo editing software application, a file name indicating the brightness change designated by the digital photo editing software application, and parameter information used therefor.

Figure 1B:
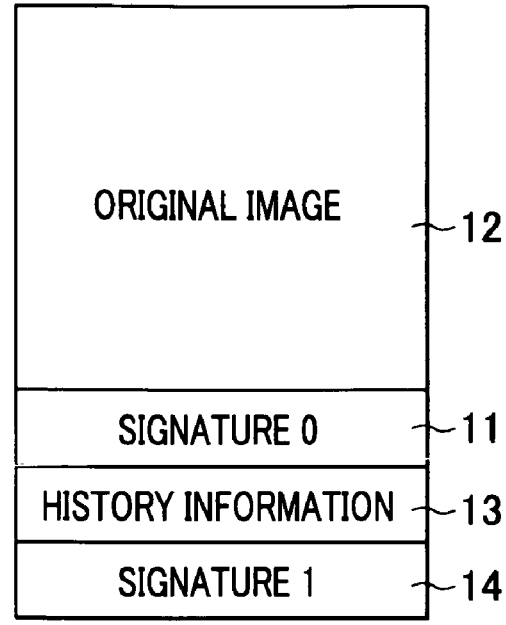

The history information 13 may also include difference data between the original image 12 and the modified image. In this case, the information for identifying the image of interest may use, for example, the ID number of the original image 12 or the first signature 11 (signature 0 in FIG. 1B), which is the signature for the original image 12. The history information 13 created in this manner and the second signature 14 are stored together with the original image 12, as shown in FIG. 1B.

The above processing is performed by an author of the digital image. Next, a case in which a user, who is not the author, desires to obtain the image whose brightness has been changed by the first processing will be discussed. The author, using a communication means, transmits to the user the original image 12, the first signature 11 (signature 0 shown in FIG. 1B), the history information 13, and the second signature 14 (signature 1 in FIG. 1B), which are stored in a storage medium.

A verification process performed by the user who receives the information will now be described.

First, the user verifies the first signature 11 (signature 0 in FIG. 1B) for the original image 12. The user uses a public key of the author of the original image 12 to convert the first signature 11 (signature 0 in FIG. 1B) so as to obtain an output h and a hash value h' of the original image 12. The user then checks whether the output h and the hash value h' match to verify the first signature 11 (signature 0 in FIG. 1B).

Next, the user verifies the second signature 14 (signature 1 in FIG. 1B) for the history information 13. The user uses a public key of the author of the history information 13 to convert the second signature 14 (signature 1 in FIG. 1B) so as to obtain an output h and a hash value h' of the history information 13. The user then checks whether the output h and the hash value h' match to verify the second signature 14 (signature 1 in FIG. 1B).

After the validities of those two pieces of data, i.e., the original image 12 and the history information 13, are verified with the first and second signatures, the same processing as the first processing written in the history information 13 is performed on the original image 12, so that the user can obtain the image whose brightness has been changed.

Figure 2:
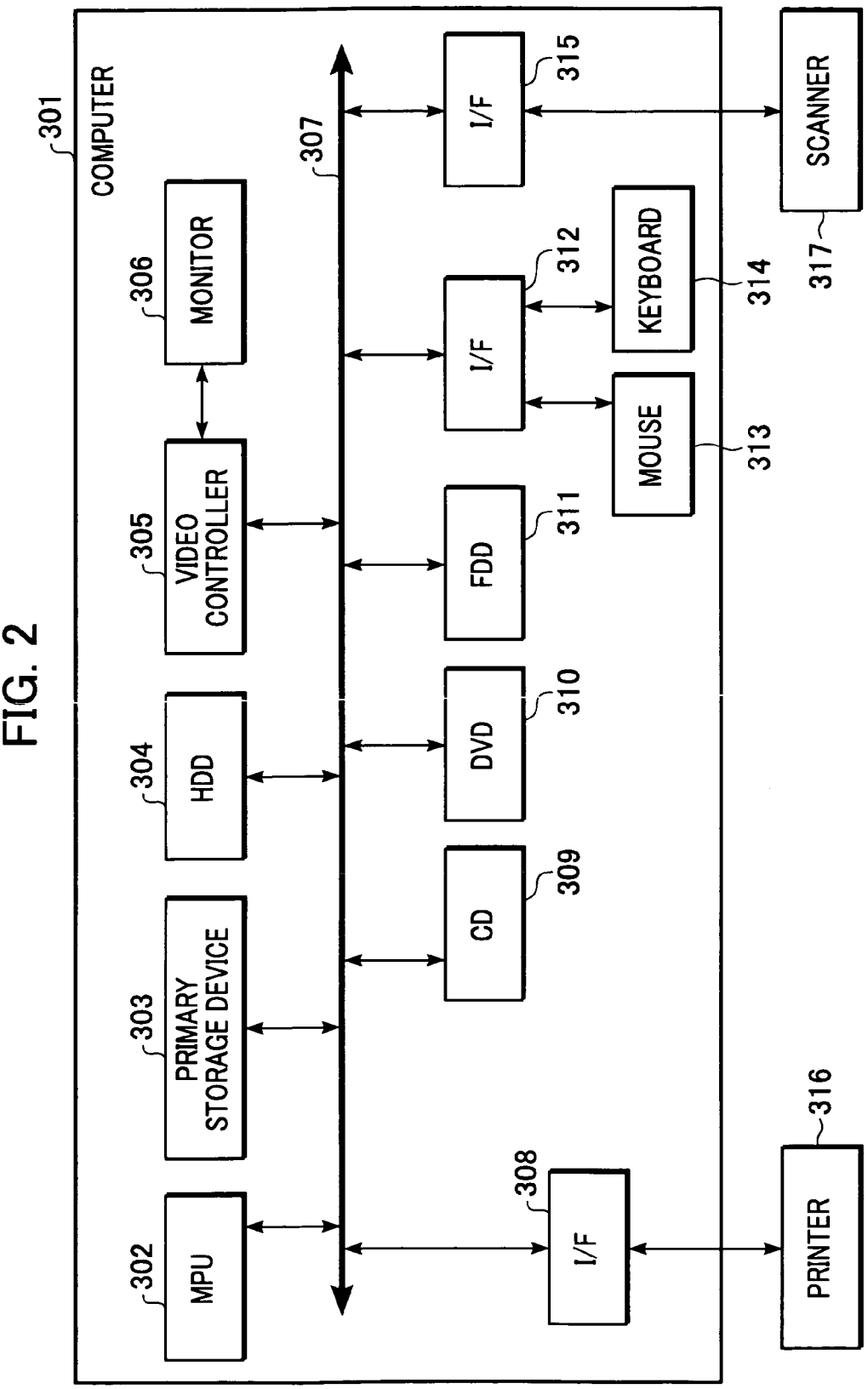
FIG. 2 is a block diagram illustrating one example of the configuration of an information processing apparatus according to the first embodiment of the present invention.

FIG. 2 is a block diagram illustrating one example of the configuration of an information processing apparatus, which performs processing as described above, according to the embodiment. It is to be noted that the use of all the functions shown in FIG. 2 is not essential for achieving the information processing apparatus of the present invention.

Referring to FIG. 2, hardware for an information processing apparatus (computer) 301 is a widely-available personal computer, and can receive an image read by an image input device 317, such as a scanner, and edit and store the image.

The information processing apparatus also allows a printer 316 to print the image obtained by the image input device 317. The user can enter various instructions and the like by operating a mouse 313 and/or a keyboard 314.

Inside the computer 301, individual blocks described below are connected through a bus 307 to allow transmission and reception of various data. A MPU (microprocessor unit) 302 controls the operations of the individual blocks in the computer 301 and executes a program stored therein.

A primary storage device 303 temporarily stores a program and image data to be processed by the MPU 302. A hard disk drive (HDD) 304 can pre-store a program and image data to be transferred to the primary storage device 303 and the like and can store processed image data.

A scanner 317 reads an original, film, or the like to generate image data. A scanner interface (I/F) 315 is connected to the scanner 317 to allow inputting of the image data obtained by the scanner 317.

A printer interface (I/F) 308 is connected to the printer 316, which prints image data, and can send image data to be printed to the printer 316.

A CD drive 309 can read data stored in a CD (CD-R/CD-RW), which is one type of external storage media, or can write data onto a CD.

Similarly, a floppy-disk drive (FDD) 311 can read data from a floppy disk (FD), which is one type of external storage media, and can write data onto a floppy disk.

Similarly, a DVD drive 310 can read data from a DVD, which is one type of external storage media, and can write data onto a DVD.

When an image-editing program and/or a printer driver are stored in the CD, FD, DVD, and the like, the programs are installed by the hard disk drive (HDD) 304 and are transferred to the primary storage device 303, as needed.

An interface (I/F) 312 is connected to the mouse 313 and the keyboard 314 to receive instructions entered at either device.

A monitor 306 is a display device that can display an extraction-process result of watermark information and a process procedure therefor. Further, a video controller 305 is a device for transmitting display data to the monitor 306.

Although the functions described above are all incorporated into the information processing apparatus 301 in this embodiment, a system in which they may be distributed to a plurality of apparatuses may be used. That is, those functions may be implemented by a system constituted by a plurality of apparatuses (e.g., a host computer, interface device, reader, printer, and the like) or may be implemented by a single apparatus (e.g., a copier or facsimile machine)

Figure 3:
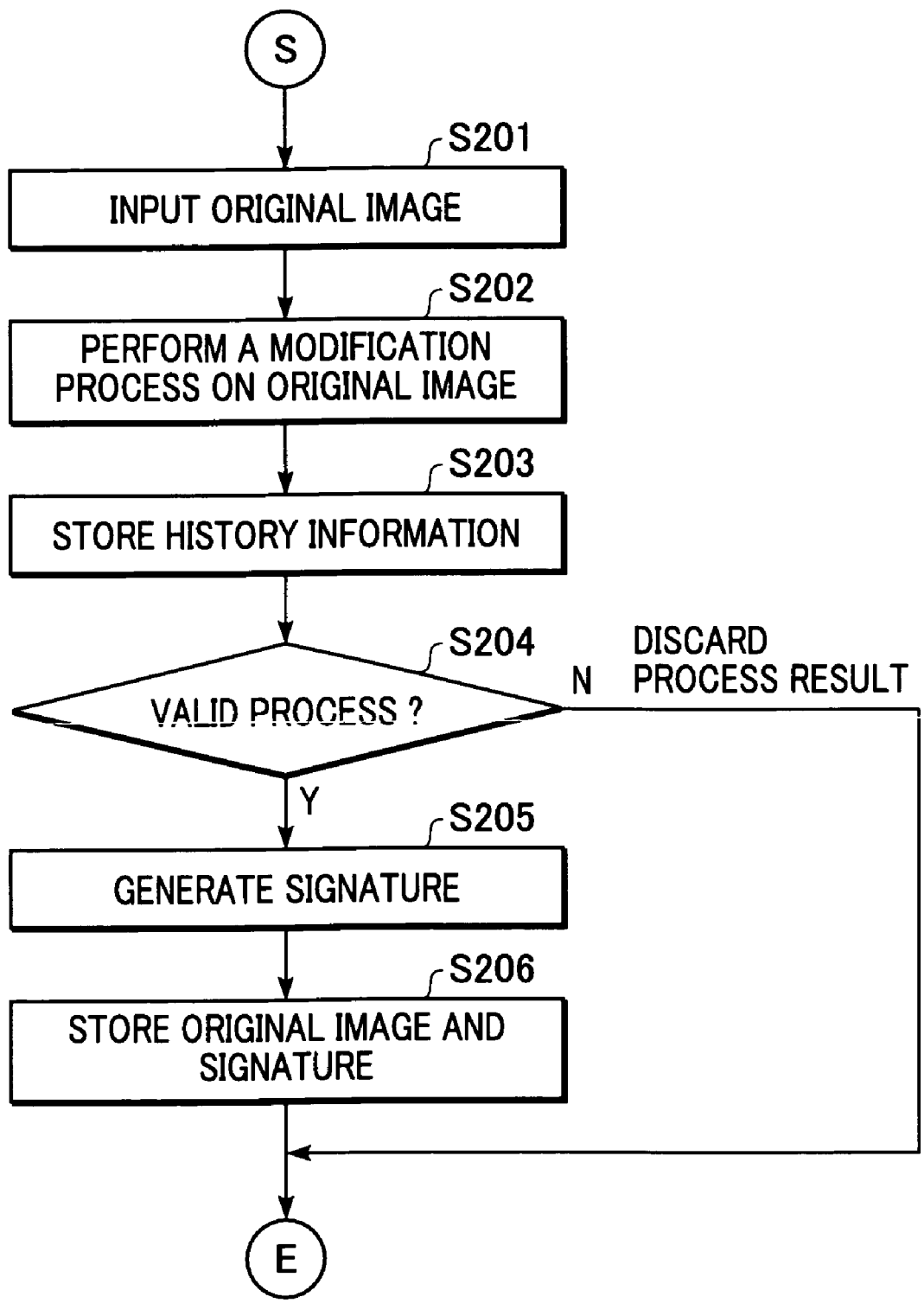
FIG. 3 is a flow chart illustrating processing for generating a digital signature in the first embodiment.

The operation of the information processing apparatus 301 of this embodiment will now be described with reference to FIGS. 3 and 4. FIG. 3 is a flow chart illustrating the process of the information processing apparatus 301 for generating a digital signature according to the present embodiment. FIG. 4 is a flow chart illustrating the process of the information processing apparatus 301 for verifying the digital signature according to the present embodiment.

Since the processing for generating the first signature (signature 0 in FIG. 1B) for the original image 12 can be performed in the same manner as the technique disclosed in U.S. Pat. No. 5,499,294 described above, the description of generating the first signature (signature 0 in FIG. 1B) is omitted. Thus, the following description is based on the premise that the original image 12 and the first signature 11 (signature 0 in FIG. 1B) are stored in one of the storage media in the information processing apparatus 301.

First, a description will be given of the processing for generating a digital signature (i.e., the second signature 14 (signature 1 in FIG. 1B)) with reference to FIG. 3. This process will hereinafter be referred to as a "signature generation process".

In step S201, the original image 12 stored in the storage medium (a storage medium connected to the hard disk drive (HDD) 304, the CD drive 309, the DVD drive 310, or the floppy-disk drive 311, or the like) is input. That is, the original image 12 that is stored in the storage medium is loaded into the primary storage device 303 in accordance with an instruction input from the mouse 313 and/or the keyboard 314.

Next, in step S202, a modification process, such as cropping, is performed on the original image 12. More than one type of modification, or multiple versions of the same type of modification can take place in step S202. In step S203, the history information 13 regarding the modification process performed in step S202 is stored in the storage medium.

In step S204, a determination is made as to whether or not the modification process is a valid process.

For the verification of validity of the modification process, an access-permission database, not shown, stores access permissions for all users, including the user in question. Based on authentication information obtained at the time of logging into information processing apparatus 301, a modification that falls within the access permission is determined as being valid and a modification that is beyond the access permission is determined as being invalid. Alternatively, the verification may be performed using the scope of access permission that is described by the author in the original data, the header, or the like. In such a case, a digital image editing software application that performs a modification process on the original image reads the information, and a modification within the scope of permission is determined as being valid and a modification beyond the scope of permission is determined as being invalid.

The validity of the modification process can also be verified using a public key. When the authentication of the signature 0 for the original image 12 is verified, a public key of the author of the original image is used. Similarly, the authentication of the signature 1 for the history information 13 can be verified using the above-noted public key of the author of the original image to determine whether the author has performed a modification process.

These processes are executed by the MPU 302 or the like. That is, the MPU 302 executes a program loaded into the primary storage device 303, in accordance with an instruction input from the mouse 313 and/or the keyboard 314. At this point, the monitor 306 also can display the execution status and/or the processing result.

When the validity of the modification process is verified and it is determined that the modified image is not valid, the processing result and the processing history are discarded and the previous image (original image 12) is recovered. When the modified image is determined as being a valid image, in step S205, a digital signature (i.e., the second signature 14 (signature 1 shown in FIG. 1B)) is created for the history information 13 stored in the storage medium. In step S206, the generated original image 12, the first signature 11 (signature 0 in FIG. 1B), the history information 13, and the second signature 14 (signature 1 in FIG. 1B) are stored by the hard disk drive 304, the CD drive 309, the DVD drive 310, or the floppy-disk drive 311.

Processing for verifying the digital signatures will now be described with reference to FIG. 4. This processing will hereinafter be referred to as a "signature verification process".

The signature verification process is based on the premise that the information processing apparatus 301 has the first signature 11 (signature 0 in FIG. 1B), the history information 13, and the second signature 14 (signature 1 in FIG. 1B). In particular, the MPU 302 or the like is used to execute a program loaded into the primary storage device 303 in accordance with an instruction input from the mouse 313 and/or the keyboard 314.

First, in step S211, the first signature 11 (signature 0 in FIG. 1B) for the original image 12 is verified. Specifically, a hash value is generated for the original image 12 and the first signature 11 (signature 0 in FIG. 1B) is converted with a public key of the author of the original image to obtain an output value. When the hash value and the output value match, it is assured that the original image 12 is the original. Next, in step S212, the second signature 14 (signature 1 in FIG. 1B) for the history information 13 is verified. Specifically, a hash value is generated for the history information 13 and the second signature 14 (signature 1 in FIG. 1B) is converted with a public key of the author of the history information 13 to obtain an output value. When the hash value and the output value match, it is assured that the history information 13 is true.

In this manner, in step S213, when the validity of the two pieces of data (the original image 12 and the history information 13) are verified with the corresponding digital signatures (the first signature 11 and the second signature 14), the same processing written in the history information 13 is performed on the original image 12. As a result, in step S214, the user obtains the image that has undergone the conversion process.

On the other hand, in step S213, when it is determined that the signatures are not authentic, the process is suspended since at least one of the original image 12 and the history information 13 is not valid. Also, when the signatures are determined not to be authentic, a notification indicating that the information (the original image 12 and the history information 13) has been tampered with may be sent to the user.

As described above, in this embodiment, since the first signature 11 (signature 0 in FIG. 1B) for the original image 12 is stored, the originality of the original image 12 can be assured.

Further, since the second signature 14 (signature 1 in FIG. 1B) for the history information 13 is stored, the validity of a modification process for the original image 12 can be assured. Thus, a modification authorized by the author can be made to the original image 12, so that the most up-to-date image can be determined to be authentic (assured).

This result cannot be accomplished using the technique disclosed in U.S. Pat. No. 5,499,294. As previously discussed, under the technique of U.S. Pat. No. 5,499,294, digital image data output from a digital camera is considered to have been tampered with if a processes is performed on the image data after the image data has been outputted from the digital camera.

Accordingly, a possible solution thereto is that the author uses his or her private key for own signature to attach a digital signature to an image whose modification is authorized. In this case, however, the modified image with the signature becomes an independent image, and thus the problem that the relationship between the original image 12 and a modified image, which is obtained by modification of the original image 12, is unclear remains. In addition, when the author approves some modifications as being authorized, there is a need to manage a great number of pairs of images and signatures, which could affect a limited memory capacity.

In contrast, in the present embodiment, when the first signature 11 (signature 0 in FIG. 1B) and the second signature 14 (signature 1 in FIG. 1B) are authentic, the relationship (processing history) between the original image 12 and the modified image can be known from the history information 13.

In addition, since the history information 13 requires a smaller amount of data than the modified image, the memory capacity can be reduced even when a large amount of history information 13 is stored, as compared to a case in which the entire modified image is stored. This is particularly effective when a modification process is performed multiple times. Such a modification process is discussed in a second embodiment below.

Since the amount of history information 13 and the signature information (the first signature 11 and the second signature 14) is smaller than the image information, the history information 13 and the signature information can be easily stored in the header of the image 12 or the like and can be managed as one file, even when there is a large amount of history information 13. This is also particularly effective when a modification process is performed multiple times.

Second Embodiment

A second embodiment of the present invention will now be described. In the following description of this embodiment, the same elements and the portions as those in the first embodiment are denoted with the same reference numbers and detailed descriptions thereof will be omitted.

While the previous embodiment described an example in which a single modification process is performed, the present embodiment is directed to a case in which multiple modification processes, i.e., a first process, a second process, third process, etc., are sequentially performed and all the processes are authorized/valid processes. That is, this embodiment can ensure that the most up-to-data image that has been modified multiple times is authentic, while ensuring the originality of the original image 12. In this case, the second process, third process and subsequent processes modify an image in the same manner as the first process.

Figure 5A:
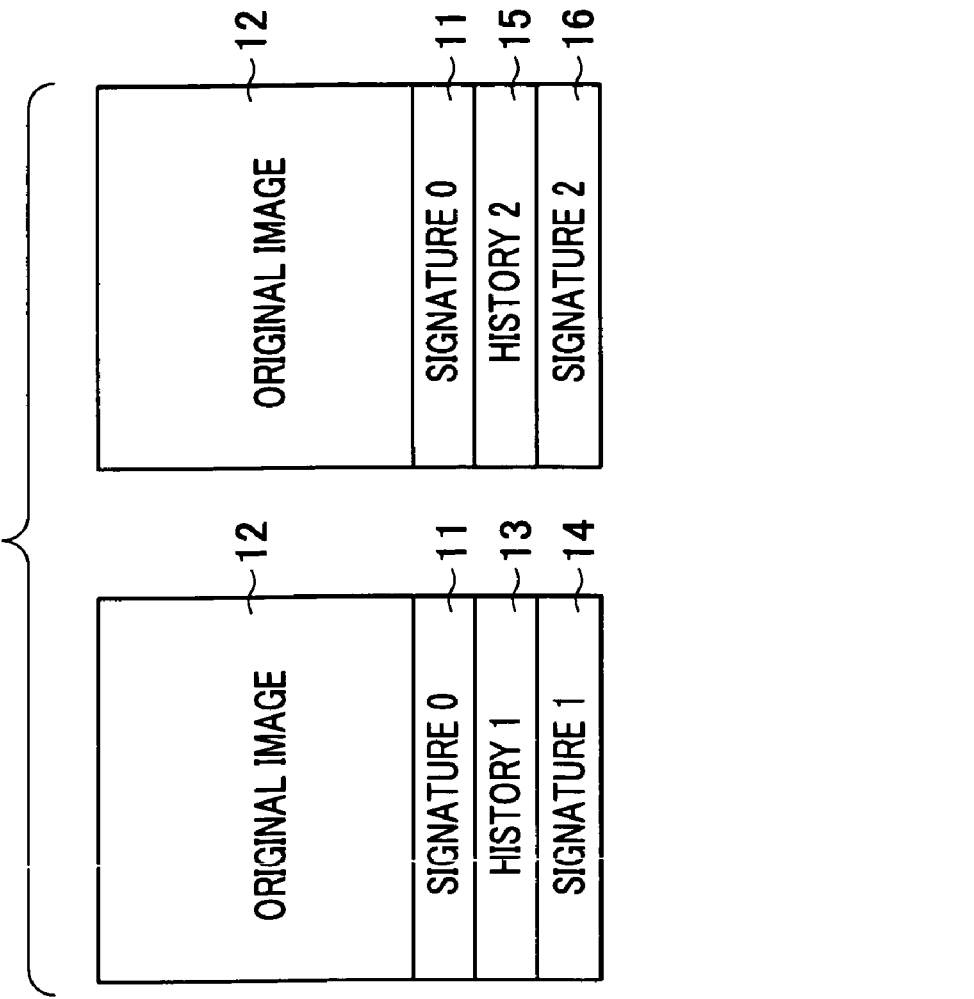
FIGS. 5A and 5B are schematic views illustrating original images, signatures, and history information, which are stored on the storage medium, in a second embodiment of the present invention.

In the present embodiment, the history information 13 generated by the information processing apparatus 301 of the first embodiment is expressed as a first history (history 1 in FIG. 5A). In the first embodiment, the processing performed in accordance with the flow chart shown in FIG. 3 is based on the premise that the original image 12 and the first signature 11 (signature 0 in FIG. 5A) are stored. In this embodiment, however, a second modification is processed in accordance with the flow chart of FIG. 3, but is based on the premise that the first history 13 (history 1 in FIG. 5A) and a second signature 14 (signature 1 in FIG. 5A) for the first history 13 (history 1 in FIG. 5A) are also stored.

As a result, a second history 15 (history 2 in FIG. 5A) for the second modification and a third signature 16 (signature 2 in FIG. 5A), which is a digital signature for the second history 15, are generated. Consequently, the second history 15 (history 2 in FIG. 5A) and the third signature 16 (signature 2 in FIG. 5A) are stored in addition to the original image 12, the first signature 11 (signature 0 in FIG. 5A), the first history 13 (history 1 in FIG. 5A), and the second signature 14 (signature 1 in FIG. 5A).

Subsequent modification processes are repeated in the same manner. Thus, when the modification process is repeated N times (N is a natural number), the original image 12, the first to Nth histories (history 1 to history N in FIG. 5A), and the first to (N+1)th signatures (signatures 0 to N in FIG. 5A) are generated by the signature generation process and are stored (see FIG. 5A).

Meanwhile, in the signature verification process for this signature generation process, the process in step S211 in the flow chart of FIG. 4, i.e., the signature verification process for the original image 12, is performed, and then, in step S212, the third to (N+1)th signatures (signatures 2 to N in FIG. 5A) are verified as well as the second signature 4 (signature 1). When it is determined in step S213 that these second to (N+1) th signatures (signatures 1 to N in FIG. 5A) are authentic, processes for the first to Nth histories (histories 1 to N in FIG. 5A) are executed on the original image 12 to modify the original image 12 in step 214.

In the current embodiment, when the second to Mth signatures (M is a natural number smaller than N+1) are authentic and the signatures thereafter are not authentic, not all processes need to be suspended. That is, the arrangement may also be such that the first to (M−1) th history processes for the second to Mth signatures are performed and the Mth to Nth history processes for the (M+1) th to (N+1) th signatures are suspended. Alternatively, rather than performing all the processing for the first to nth histories (histories 1 to N in FIG. 5A) after all the second to (N+1) th signatures (signatures 1 to N in FIG. 5A) are determined to be authentic, verification and modification processes may be alternately performed in such a manner that, when the second signature is authentic, a processing for the first history is executed, and then, when the third process is valid, a process for the second history is executed.

As described above, in the current embodiment, the first to Nth histories, which are history information for the first to Nth modifications, and the second to (N+1) th signatures, which are digital signatures for the first to Nth histories, are generated. A determination is made using the second to (N+1) th signatures as to whether the first to Nth histories are valid. When it is determined that they are valid, a modification process is performed on the original image 12 in accordance with the first to Nth histories. As a result, it can always be assured that the most up-to-data image is authentic, even when multiple performances of a modification process are authorized.

Figure 5B:
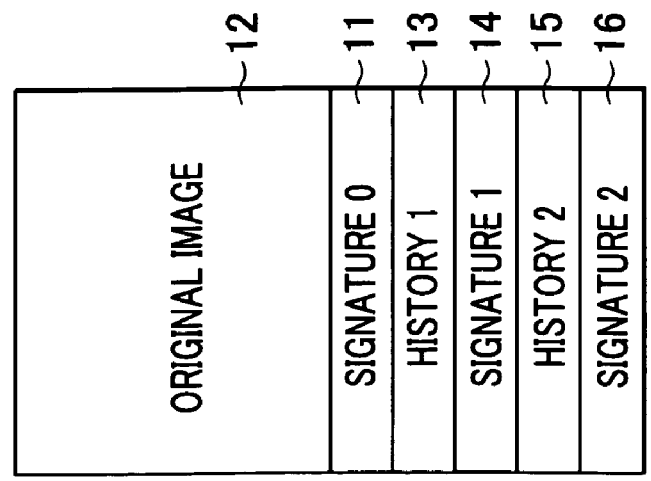

Also, when the author authorizes a new second process that is different from the first process, performing the processing in accordance with the flow charts shown in FIGS. 3 and 4 on history information of the second process instead of the first process assures the validity and originality of a modification made in the second process. In such a case, the relationship between the first process and the second process is illustrated in FIG. 5B. In addition, history information and digital signatures can be separately managed for each process via the use of a table 60, as shown in FIG. 6. Descriptive information such as the purpose and/or effect of the process may also be included in the table 60. A management database may be provided to manage the history information and the digital signatures so that they are registered for each modification. The user can refer to the database when needed.

Third Embodiment

A third embodiment of the present invention will now be described. In the following description of this embodiment, the same elements and the portions as those in the first and second embodiments are denoted with the same reference numbers and detailed descriptions thereof will be omitted.

Figure 7:
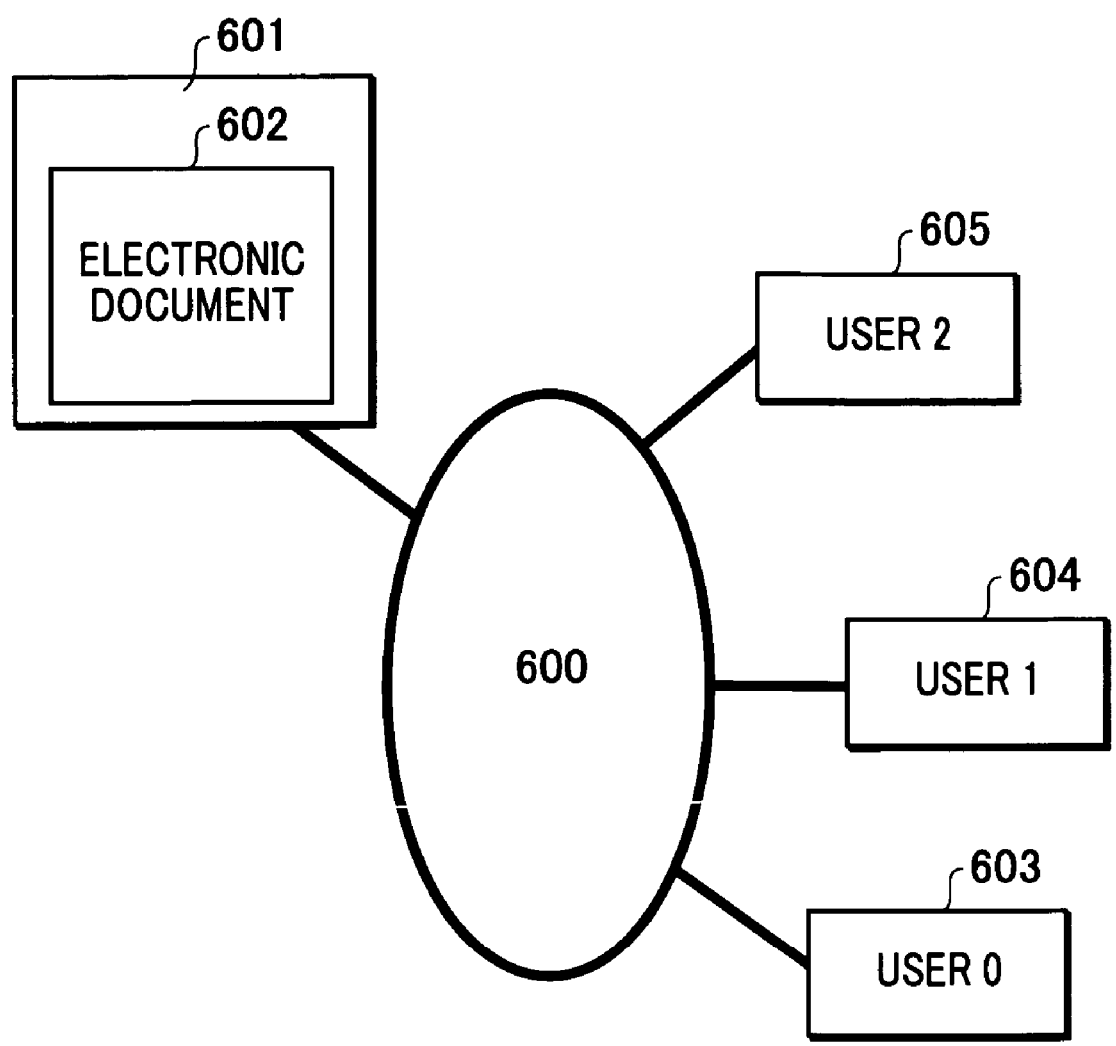
FIG. 7 is a block diagram illustrating one example of the configuration of an electronic data management system according to third and fourth embodiments of the present invention.

While the first and second embodiments illustrate examples in which all the process modifications are done by the author of the digital data, the third embodiment illustrates a case in which many users can modify one piece of digital data. In this embodiment, the digital data will be described in connection with an electronic document by way of example. As shown in FIG. 7, multiple users 603 to 605 share an electronic document 602 on a server 601, and create and modify the electronic document 602 over a network 600.

It is to be noted that the users 603 to 605 refer to terminals in the possession of users and the hardware of each terminal is constituted by, for example, the information processing apparatus 301 shown in FIG. 2. The processing of the server 601 and the users 603 to 605 will be described below.

First, the user 603 creates the electronic document 602, which serves as a first document or draft, attaches a signature to the first document, and stores the resulting document in the server 601. In the description below, the signature for the first document will be referred to as a "first signature". This first signature is also created by the same method used for creating the first signature 11 (signature 0) described in conjunction with the first and second embodiments.

Next, when the user 604 desires to modify the electronic document 602 stored on the server 601, the user 604 first verifies the first document and the first signature for the first documents. Specifically, as in the first and second embodiments, a hash value for the first document is generated and the first signature is also converted with the public key of the author of the first document to obtain an output value. When the hash value and the output value match, it is assured that the first document is truly original. When the first signature is authentic, a modification is made to the first document to create a second document and first history information regarding the modification of the first document and a second signature for the history information is attached to the second document. The first history information and the second signature are created by the same method for the first history information 13 (history 1) and the second signature 14 (signature 1) described in the first and second embodiments.

For the verification of validity of the modification process, an access-permission database, not shown, stores access permissions of all users, including the user in question. Thus, based on authentication information obtained when each user logs into the computer shown in FIG. 2, a modification that falls within the access permission is determined to be valid and a modification beyond the access permission is determined to be invalid. Alternatively, the user 603, who is the first author, can set the scope of access permission in the electronic document, for example in the document's header information. The digital image editing software application used to modify the electronic document reads the scope of access permission located in the header, and a determination as to whether the modification is valid or not is made.

The validity of the modification process can be verified using a public key. In such a case, a signature is generated using a private key for a group of users that are permitted to make modifications rather than using a private key for each user, and a public key of the group is used for verification. For determining the authenticity of the first signature for the first document, the public key of the group is used. Also, for determining the authenticity of the second signature for the second history information, the previously used public key of the group is used. This arrangement allows for recognition of the fact that someone in the group has performed a modification process.

When another user or the same user wishes to modify the document again, history information regarding the modification and a signature for the history information are attached to the document, thereby making it possible to manage modification of the electronic document by a plurality of users.

When one user, however, checks signatures and determines that a signature is not authentic, the user notifies other users of the result. Also, when one user regards modifications from the first history information to the Mth history information (M is a natural number) as valid and modifications thereafter as invalid, the user creates the Mth document, which is modified in accordance with history information the user regarded as being valid, and then performs modification that is different from the (M+1)th history information. Subsequently, the user can include, in the history information, information (a document number, a hash value, etc.) for identifying the Mth document as a document of interest, and can create a signature therefor. In such a case, as illustrated in FIG. 5B for the second embodiment, since the created signature and signatures are in a parallel relationship, the table 60 indicating the relationship between those signatures, as shown in FIG. 6, can also be created in a document management system for easy recognition.

Fourth Embodiment

A fourth embodiment of the present invention will now be described. In the following description of this embodiment, the same elements and the portions as those in the first to third embodiments are denoted with the same reference numbers and detailed descriptions thereof will be omitted. This embodiment will be described in conjunction with a medical image management system for a medical image by way of example.

As shown in FIG. 7, this system is premised on a case in which multiple users (i.e., doctors) 603 to 605 share an electronic medical image 602, such as a digital X-ray image, on a server 601 connected over a network 600.

In this case, a first signature, which is information for assuring the originality of the medical image 602, is stored in digital X-ray equipment or is generated at a point when the medical image 602 is output from the digital X-ray equipment and is stored on the server 601.

When a first doctor 603 sees the medical image 602, the doctor 603 changes visual effects, such as brightness, while not editing the contents of the medical image 602. In this case, in order to eliminate a need for the doctor 603 to change the brightness every time, the difference between the original medical image 602 and the modified image is obtained, and information for identifying the medical image of interest and descriptive information regarding the modification are attached to the medical image 602 and are stored as first history information.

The first doctor 603 generates his or her own signature for a hash value of the first history information and either stores the signature on the server 601 as a second signature or stores the signature on his or her own terminal. The first history information and the second signature are generated by the same method as for the first history information 13 (history 1) and the second signature 14 (signature 1) described in conjunction with the first to third embodiments.

Next, when a second doctor 604 sees the medical image 602, the originality thereof is verified with the first signature and the validity of the first history information is verified with the second signature to check the processing performed by the first doctor 603. Thereafter, the second doctor 604 can utilize the medical image 602 or can further process the medical image 602.

For further processing in this case, when the second doctor 604 modifies a medical image modified in accordance with the first history information, the second doctor 604 includes a second signature in second history information as information for the image to be modified and further adds the difference image between the image to be modified and an image modified on his or her own terminal to the second history information. Then, the second doctor 604 generates a third signature. Also, when the second doctor 604 modifies the original image (medical image 602), he or she includes the first signature in second history information and further adds the difference image between the original image (medical image 602) and the image modified on his or her own terminal to the second history information. Then, the second doctor 604 generates a third signature.

Repeating the process described above allows the medical image management system of this embodiment to simultaneously achieve the originality of the original image, the validity of a modification process, and the most up-to-data image. The second history information and the third signature are generated by the same method as for the second history information 15 (history 2) and the third signature 16 (signature 2) described in conjunction with the first to third embodiments.

Fifth Embodiment

A fifth embodiment of the present invention will now be described. In the following description of this embodiment, the same elements and the portions as those in the first to fourth embodiments are denoted with the same reference numbers and detailed descriptions thereof will be omitted. A description in this embodiment will be given of a business model using a copyright-product management system. The example includes a network with multiple users and an author holding a primary copyright for an original image. The author has the original image 12 and the first signature 11 (signature 0) therefor, as shown in FIG. 1A.

Figure 8:
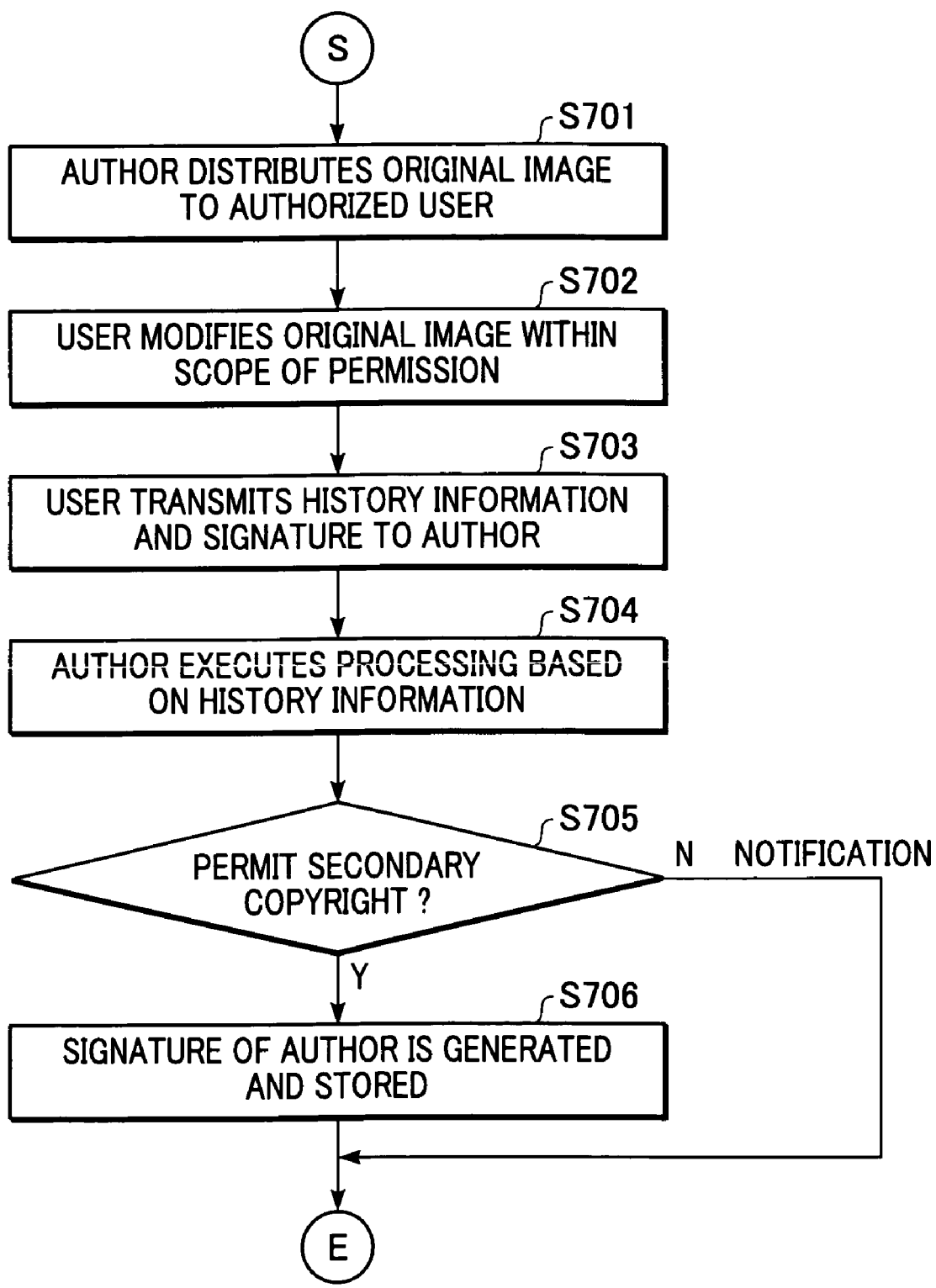
FIG. 8 is a flow chart illustrating processing performed in a copyright-product management system, in a fifth embodiment of the present invention.

Processing of the system of this embodiment will now be described with reference to the flow chart depicted in FIG. 8.

First, in step S701, the author distributes the original image 12 to a user or users who are considered authorized based on accounting information. The original image 12 may also incorporate a scheme for copyright protection, such as a digital watermark. In addition to the original image 12, the above-noted first signature (signature 0) representing the originality of the original image 12 is also distributed. While each user is granted permission to modify the original image 12 for their own personal use, the user(s) are not permitted to distribute the original image 12 and a modified version of the original image 12.

After verifying the signature of the original image 12, in step S702, each user modifies the original image 12, where the modification must be within the user's scope of permission. When the user wishes to copyright a modified image as a secondary copyright product, in step S703, the user transmits to the author the first history information 13, which is history information regarding the modification made by the user, in addition to the original image 12 and the first signature 11 (signature 0), and the second signature 14 (signature 1), which is a digital signature for the history information 13. Further, the second signature 14 (signature 1) is made using a user's private key. The public key for verifying it can be sent along with the second signature 14 (signature 1).

In step S704, the author verifies the first signature 11 (signature 0) and the second signature 14 (signature 1) to perform processing on the original image 12 in accordance with the first history information 13. Next, the author checks the processing result (not shown). In step S705, if the author allows the modified image as a secondary copyright product, a digital signature is generated using an author's private key for the history information 13. The original image, the first signature 11 (signature 0), the first history information 13, the second signature 14 (signature 1), and the third signature 16 (signature 2) are then stored together in step S706. If the author does not Permit the modified image as a secondary copyright product, the third signature (signature 2) 16 is not generated and the user is notified as such.

In this manner, in this embodiment, when the author of the original image permits a modification process, a signature for the modification process is generated using an author's private key. Thus, this arrangement allows the author to achieve a scheme in which a secondary copyright product is efficiently produced from a primary copyright product, which is the original image 12 in this embodiment. Further, this arrangement can realize a scheme that allows each user to have an authorized self-generated secondary copyright product. By granting/permitting a plurality of secondary copyright products, the author can collect copyright fees for each of the granted/permitted products. Each user can easily generate a secondary copyright product based on a primary copyright product while the author can collect the associated secondary copyright fees. The above process can be applied to a third, fourth, etc. copyright product.

Other Embodiments

The above-described object of the present invention can also be achieved by a storage medium (or recording medium) in which software program code that realizes the features of the illustrated embodiments is stored. That is, the object of the present invention can be achieved such that a storage medium in which such program code is stored/recorded is supplied to a system or apparatus and a computer (or CPU or MPU) of the system or the apparatus reads and executes the program code. In such a case, the program code that is read from the storage medium achieves the features of the embodiments described above and the storage medium in which the program code is recorded is also encompassed by the present invention.

Further, not only is the program code that is read from the computer executed to achieve the features of the illustrated embodiments, but also an operating system (OS) or the like that is running on the computer may perform part or all of the actual processing in accordance with an instruction of the program code to achieve the features of the illustrated embodiment. Such an arrangement is also covered by the present invention.

Additionally, after the program code that is read from the storage medium is stored in a memory that is provided in a plug-in card inserted into the computer or an expansion unit connected to the computer, a CPU or the like that is provided in the plug-in card or the expansion unit may perform part or all of the actual processing in accordance with an instruction of the program code to achieve the features of the illustrated embodiments. Such an arrangement is also encompassed by the present invention.

When the present invention is applied to the above-noted storage medium, the storage medium stores program code corresponding to the processes of the present invention depicted in the flow charts discussed above.

As described above, according to the illustrated embodiments, when original data created by a predetermined author is modified, modification information regarding the modification is stored in the storage medium and modification assuring information for assuring that the modification information is true is created. Thus, a determination can be made as to whether the modification to the original data is authorized based on the modification assuring information. Thus, when it is determined that the modification is valid, the original data can be modified based on the modification information. Thus, the present invention allows for a valid modification authorized by the author of the original data, while assuring the originality of the original data. The present invention can also assure both the originality of the original and the most up-to-date data. The modification information also allows for recognition of the relationship between the original data and the modified data, which makes it possible to assure that the relationship therebetween is proper. Additionally, since the modification information has a small amount of data compared to the modified data itself, it is possible to readily reduce the storage capacity needed to modify the original data.

The foregoing description of embodiments has been given for illustrative purposes only and not to be construed as imposing any limitation in any respect.

The scope of the invention is, therefore, to be determined solely by the following claims and not limited by the text of the specifications and alterations made within a scope equivalent to the scope of the claims fall within the true spirit and scope of the invention.

What is claimed is:

1. An information processing apparatus for processing original data created by a predetermined author, the apparatus comprising:

inputting means for inputting the original data, original-data assuring information for assuring that the original data is an original, a first piece of modification information that indicates how to modify the original data to obtain modified original data, a sequence of (n−1) pieces, up to an nth piece, of modification information, where for (2≦k≦n−1) the kth piece of modification information indicates how to modify the original data already modified in sequence by the first to the (k−1)th piece of modification information, and n pieces of modification-assuring-information for detecting whether corresponding modification information has been altered;

original-data verifying means for verifying, by the original-data assuring information, that the original data is assured as being an original;

modification-information verifying means for verifying, by the respective pieces of modification-assuring-information, that the respective pieces of modification information regarding a modification of the original data is assured as not having been altered;

determination means for determining whether the original data and the respective pieces of modification information have been altered; and modifying means for modifying the original data based on the first to the nth piece of modification information when the determination means determines that none of the first to the nth piece of modification information has been altered, modifying the original data based on the first to the mth piece of modification information when the determination means determines that none of the original data and the first to the mth piece of modification information has been altered and that an (m+1)th piece of modification information has been altered, and not modifying the original data when the determination means determines that either the original data or the first piece of modification information has been altered.

2. The information processing apparatus according to claim 1, wherein the original-data verifying means verifies a digital signature for the original data and the modification-information verifying means verifies respective digital signatures for the respective pieces of modification information.

3. An information processing method for processing original data created by a predetermined author, the information processing method comprising:

inputting the original data, original-data assuring information for assuring that the original data is an original, a first piece of modification information that indicates how to modify the original data to obtain modified original data, a sequence of (n−1) pieces, up to an nth piece, of modification information, where for (2≦k≦n−1) the kth piece of modification information indicates how to modify the original data already modified in sequence by the first to the (k−1)th piece of modification information, and n pieces of modification-assuring-information for detecting whether corresponding modification information has been altered;

verifying, by the original-data assuring information, that the original data is assured as being an original;

verifying, by the respective pieces of modification-assuring-information, that the respective pieces modification information regarding a modification of the original data is assured as not having been altered;

determining whether the original data and the respective pieces of modification information have been altered; and modifying the original data based on the first to the nth piece of modification information when the determination means determines that none of the first to the nth piece of modification information has been altered, modifying the original data based on the first to the mth piece of modification information when the determination means determines that none of the original data and the first to the mth piece of modification information has been altered and that an (m+1)th piece of modification information has been altered, and not modifying the original data when the determination means determines that either the original data or the first piece of modification information has been altered.

4. The information processing method according to claim 3, wherein a digital signature for the original data is verified as part of verifying that the original data is assured as being an original and respective digital signatures for the respective pieces of modification information are verified as part of verifying, by the respective pieces of modification-assuring-information, that the respective pieces modification information regarding a modification of the original data is assured as not having been altered.

5. A computer-readable storage medium storing a computer program that executes the information processing method according to claim 3.

6. The method of claim 1, wherein the original data is stored in a file having a header, and wherein at least one of the modification information, the modification-assuring-information, and the original-data assuring information is stored in the header.

7. The method of claim 3, wherein the original data is stored in a file having a header, and wherein at least one of the modification information, the modification-assuring-information, and the original-data assuring information is stored in the header.

* * * * *